United States Patent [19]

Fusey

[11] 3,919,112

[45] Nov. 11, 1975

[54] COMPOSITION TO EMULSIFY MINERAL OIL PRODUCTS IN BIODEGRADABLE FORM

[75] Inventor: Pierre Fusey, Paris, France

[73] Assignee: Societe Anonyme: Banque pour l'Expansion Industrielle "Banexi", Paris, France

[22] Filed: Feb. 13, 1973

[21] Appl. No.: 332,087

[30] Foreign Application Priority Data

Feb. 22, 1972   France ............................ 72.05893

[52] U.S. Cl. .......... 252/352; 210/DIG. 21; 252/354; 252/356; 252/DIG. 6
[51] Int. Cl.² .................................. B01F 17/00
[58] Field of Search ...... 252/354, 356, 352, DIG. 6; 210/DIG. 21

[56] References Cited
UNITED STATES PATENTS

| | | |
|---|---|---|
| 2,573,599 | 10/1951 | Price .............................. 252/312 |
| 3,609,096 | 9/1971 | Salomone ...................... 252/352 |
| 3,625,857 | 12/1971 | Weimer et al. ................. 252/312 |
| 3,714,063 | 1/1973 | Salomone ................... 252/352 X |

*Primary Examiner*—Richard D. Lovering
*Attorney, Agent, or Firm*—Young & Thompson

[57] ABSTRACT

The present invention concerns a composition for the elimination of mineral oil products by biodegradation, containing a source rich in amino-acids and containing phosphorus such as a vinasse, enriched if desired, with amino-acids. It is characterised in that at least one oleophilic element constituted by a fatty acid is combined with a source rich in amino-acids and containing phosphorus, the pH then being adjusted between 7 and 7.5 by addition of a basic element. This composition may be used in liquid form for the atomisation of floating oil slicks and for the cleaning of vats and tanks for mineral oil products and it may be brought into the form of paste or powder by the addition of mineral charges.

6 Claims, No Drawings

COMPOSITION TO EMULSIFY MINERAL OIL PRODUCTS IN BIODEGRADABLE FORM

The present invention relates to a composition for bringing mineral oil, especially petroleum products into the form of a biodegradable emulsion.

Compositions have already been proposed for bringing mineral oil products into the form of a biodegradable emulsion, these compositions having a base of organic substances capable of supplying micro-organism, such as carbohydrates or hydrophilic polypeptides in the form of molasses, various residual wash liquors (vinasses), casein, etc, together with emulsifying agents or various chemical substances such as mineral or organic acids or the alkali or alkaline earth metals salts thereof. These compostions give stable emulsions and are perfectly biodegradable, particularly when the biodegradation is effected in a closed medium.

In fact, in order to be biodegradable, an emulsion of mineral oil, especially petroleum products must not be toxic and it must contain sources of carbon, nitrogen and phosphorus in sufficient quantity to ensure, for the micro-organisms, the elements necessary for the constitution of living matter. The biodegradation of mineral oil products results from the use by the micro-organisms of the hydrocarbons as a source of carbon and it is necessary that the composition used for emulsifying should contain considerable sources of nitrogen and sources of phosphorus in a smaller quantity. These sources of nitrogen and phosphorus exist in previously proposed compositions, but the emulsion is made via the intermediary of oleophilic agents which are water-soluble or the nitrogenous or phosphorus elements are not closely bound to the hydrocarbon molecules. In every case the nitrogenous and phosphorus elements are dispersed in the dilute emulsion. If this dilution is contained as in the case of biodegradation effected in a tank or the like, for example for a biodegradation intended to transform the hydrocarbons into fertilising materials or in the case of the use of the emulsion as a culture medium for micro-organisms, said micro-organisms find the nitrogenous and phosphated elements within their immediate reach. On the other hand, in the case of very extensive dilution, for example, in the case of discarded material discharged into the river or sea, the content of nitrogen and phosphorus in the medium surrounding the hydrocarbon molecules is insufficient to permit the growth of micro-organisms.

The object of the present invention is to minimize these disadvantages by utilizing in known manner for the composition, a source rich in amino-acids and containing phosphorus such as a residuary liquor (vinasse) enriched, if desired, with amino-acids, and is characterised in that at least one oleophilic element formed by a fatty acid is combined with said source rich in amino-acids and containing phosphorus.

According to another feature of the present invention, a basic element is added to the composition selected from potassium hydroxide, sodium hydroxide, ammonia and their basic salts, in a quantity such that the pH of the composition is substantially 7 to 7.5.

The vinasses used in the composition are preferably magnesium or potassium residuary liquors obtained from sugar refineries or residuary liquors from the production of glutamic acid.

The amino-acids used to enrich the vinasses in nitrogen may be selected from glutamic acid, glycocoll, tyrosine, leucine, proline, lysine, valine, betaine, histidine, alanine, etc. or natural sources rich in amino-acids such as casein.

The fatty acids utilized are preferably fatty acids which are liquid at ambient temperature, such as caproic acid, octoic acid, caprylic acid, oleic acid, etc.

In order to improve the stability of the emulsion, certain non-toxic and entirely biodegradable emulsifiers may be added, such as sodium oleylisethionate, sodium methylaminoethanesulphonate, sodium laurylsulphate, secondary sulphonated paraffins, sulphonated alpha-olefins, sarcosinates, 2-amino-2-hydroxymethyl-1-3-propanediol, aminomethylpropanol, certain ethoxylated fatty alcohols, polyoxyethyleneglycol oleate, etc.

The composition is constituted by a vinasse enriched in amino-acids to which there is added to 6 to 20% by weight of fatty acid. The quantity of base or basic salt depends on the basicity of the added agent and the acidity of the vinasse enriched in amino-acids and fatty acids. In general, it is 8 to 20% by weight of the vinasse, enriched with aminoacids, and fatty acids mixture. The quantity of the emulsifier added to the above composition may amount up to 5% by weight.

To make the compostion sufficiently fluid for spraying 20 to 50% by weight of water is added. If is possible, but not desirable to dilute the composition even more.

For certain applications, particularly for the protection of beaches from oil deposits, it is necessary to bring the composition into the form of a paste. In order to do this, a small quantity of water is added to the composition and mineral charges are added thereto, for example, calcium phosphate or calcium carbonate.

If necessary, it may also be brought into the form of a powder by increasing the content of mineral charges.

The composition according to the present invention is used in a ratio of 30 to 60 parts by weight to 100 parts by weight of petroleum products.

Various examples of composition according to the present invention will be described hereinafter.

EXAMPLE 1

The following constituents are added in the following order and mixed well together:

| | |
|---|---|
| Magnesium vinasse from sugar refinery | 100 parts by weight |
| Crude glutamic acid (85%) | 20 parts by weight |
| Octoic acid | 20 parts by weight |
| Ammonia at 22 Be | 16 parts by weight |
| Water | 44 parts by weight |

100 gr. of crude mineral oil were poured onto the surface of a tank containing 100 litres of sea water reproducing a marine ecological micro-medium and 50 gr. of the composition were sprayed on the layer of mineral oil so formed. An emulsion was formed which remained in suspension in the upper layers a feature which is of interest since it concerns the most oxygenated layers. The flora continued to develop normally. A sea bird dipped in the above tank, then rinsed by immersion in a trough of sea water, showed no adhesion of the emulsion.

The biodegradation was monitored by chromatography in a gaseous phase. The speed of degradation varied as a function of the the various factors such as temperature, aeration, natural concentration of the medium in micro-organisms, etc. Comparison with reference tanks showed that it was at least twenty times faster than natural biodegradation. Under conditions corresponding to temperate seas, it was completed within 1 to 3 months.

EXAMPLE 2

In the same manner as Example 1, a composition was prepared formed by:

| | |
|---|---|
| Potassium vinasse from sugar refinery | 100 parts by weight |
| Crude glutamic acid | 15 parts by weight |
| Oleic acid | 10 parts by weight |
| Caustic potash lye d = 1.34 | 16 parts by weight |
| Water | 59 parts by weight |

This composition, used in the same manner as in Example 1, gave similar results.

EXAMPLE 3

The same composition was prepared as in Example 1, but by replacing the 16 parts of ammonia with 60 parts by weight of diammonium phosphate. The composition was used in the same manner as in example 1 with similar results.

EXAMPLE 4

Preparation was effected in the same manner as in Example 1, that is to say, by the addition in the following order, of the constituents with stirring between successive additions:

| | |
|---|---|
| Vinasse from the preparation of glutamic acid | 100 parts by weight |
| Crude glutamic acid | 10 parts by weight |
| Octoic acid | 10 parts by weight |
| Caustic soda lye at 36 Be | 16 parts by weight |
| Water | 64 parts by weight |

This composition was used in the same manner as in Example 1 in a ratio of 45 parts to 100 parts of mineral oil products.

EXAMPLE 5

The same composition was prepared as in Example 4, but by replacing the 10 parts of crude glutamic acid by 10 parts of soluble casein. The composition was used in a ratio of 40 parts by weight to 100 parts of mineral oil products.

EXAMPLE 6

In the composition of Example 4, there were added three parts by weight of sodium oleylisethionate before adding the water. Used in the same manner as that in Example 4, the composition gave a finer emulsion.

EXAMPLE 7

The following composition was prepared by successive additions with stirring between the various additions:

| | |
|---|---|
| Magnesium vinasse from sugar refinery | 100 parts by weight |
| Casein | 10 parts by weight |
| Octoic acid | 10 parts by weight |
| Caustic potash lye d = 1.34 | 16 parts by weight |
| Sodium methylaminoethane sulphonate | 1 part by weight |
| Sodium lauryl sulphate | 2 parts by weight |
| Water | 63 parts by weight |

This composition utilized in a ratio of 40 parts by weight to 100 parts by weight of mineral oil products gave as fine an emulsion as in Example 6.

EXAMPLE 8

The following composition was prepared in the same manner as in Example 7:

| | |
|---|---|
| Glutamic acid vinasse | 100 parts by weight |
| Crude glutamic acid | 10 parts by weight |
| Octoic acid | 10 parts by weight |
| Caustic soda lye at 36 Be | 16 parts by weight |
| Sodium Oleylisethionate | 2 parts by weight |
| Sodium lauryl sulphate | 4 parts by weight |
| Water | 58 parts by weight |

This composition was utilized in a ratio of 30 parts by weight to 100 parts of mineral oil products.

In the foregoing, it has been proposed ot use the compositions for spraying on oil slicks on the surface of layers of water, but these compositions can also be used for the biodegradable emulsifying of residues on the bottom of tanks by stirring with these residues, followed by dilution in water, for cleaning surfaces soiled by petroleum products or for other similar purposes. The composition may be less diluted for some of these applications. Although the composition is particularly intended to maintain the biodegradable character of the emulsion during the dispersion thereof in a large volume of water, the slightly diluted emulsion, particularly that obtained from residues on the bottom of tanks, may be subjected to biodegradation in a confined medium the products of the biodegradation having a certain fertilising action.

The composition may also be used in a pasty form, for instance, so as to be disposed on a line at the limit of the tide on beaches threatened by oil slicks.

EXAMPLE 9

A pasty composition was prepared by mixing in succession and in the following order:

| | |
|---|---|
| Vinasse from the preparation of glutamic acid | 100 parts by weight |
| Octoic acid | 9 parts by weight |
| Polyoxyethyleneglycol oleate | 22 parts by weight |
| Caustic soda lye at 36 Be | 13 parts by weight |
| Calcium phosphate | 13 parts by weight |
| Calcium carbonate | 44 parts by weight |
| Water | 20 parts by weight |

In a hydrographic research tank, a line of the pasty composition was deposited on a layer of sand and then an oil slick was advanced towards it. Under the effect of the artificial swell, the oil slick reaching the beach was emulsified with the composition and the emulsion, similar to those obtained with other compositions, was dispersed in the surface layers, the emulsion deposited on the sand being naturally washed by the swell.

The composition proved to be effective in a ratio of 25 parts by weight to 100 parts by weight of mineral oil products.

The above compositions, given by way of example only, may be modified in many ways without departing from the scope of the present invention, thus the addition of water to enable the composition to be sprayed may be completely or partially effected at the place of use.

What is claimed is:

1. A composition to emulsify mineral oil products in a form biodegradable by micro-organisms consisting essentially of a mixture of 100 parts by weight of a vinasse, 6 to 20 parts by weight of a fatty acid selected from the group consisting of oleic acid, caproic acid, caprylic acid and octoic acid, and 8 to 20 parts by weight of a basic substance selected from the group consisting of ammonia, potash lye, soda lye and basic salt.

2. A composition according to claim 1 including an effective amount of a substance rich in amino acid, said amount being effective to enrich the vinasse in amino acid.

3. A composition according to claim 2 in which the substance rich in amino acid is selected from the group consisting of glutamic acid, glycocoll, tyrosine, leucine, proline, lysine, valine, betaine, histidine, alanine and casein.

4. A composition according to claim 1, and an effective amount up to 5% by weight of said vinasse of a non-toxic and entirely biodegradable emulsifier, said amount being effective to make a finer emulsion of said composition in water.

5. A composition according to claim 4 in which the emulsifier is selected from the group consisting of sodium oleylisethionate, sodium methylaminoethane sulphonate, sodium lauryl sulphate, secondary sulphonated paraffin, sulphonated alpha-olefin, sarcosinate, 2-amino-2-hydroxymethyl-1, 2-propanediol, aminomethyl propanol, ethoxylated fatty alcohol and polyoxyethyleneglycol oleate.

6. A composition according to claim 1 further comprising 20 to 50% by its weight of water.

* * * * *